Patented Sept. 10, 1940

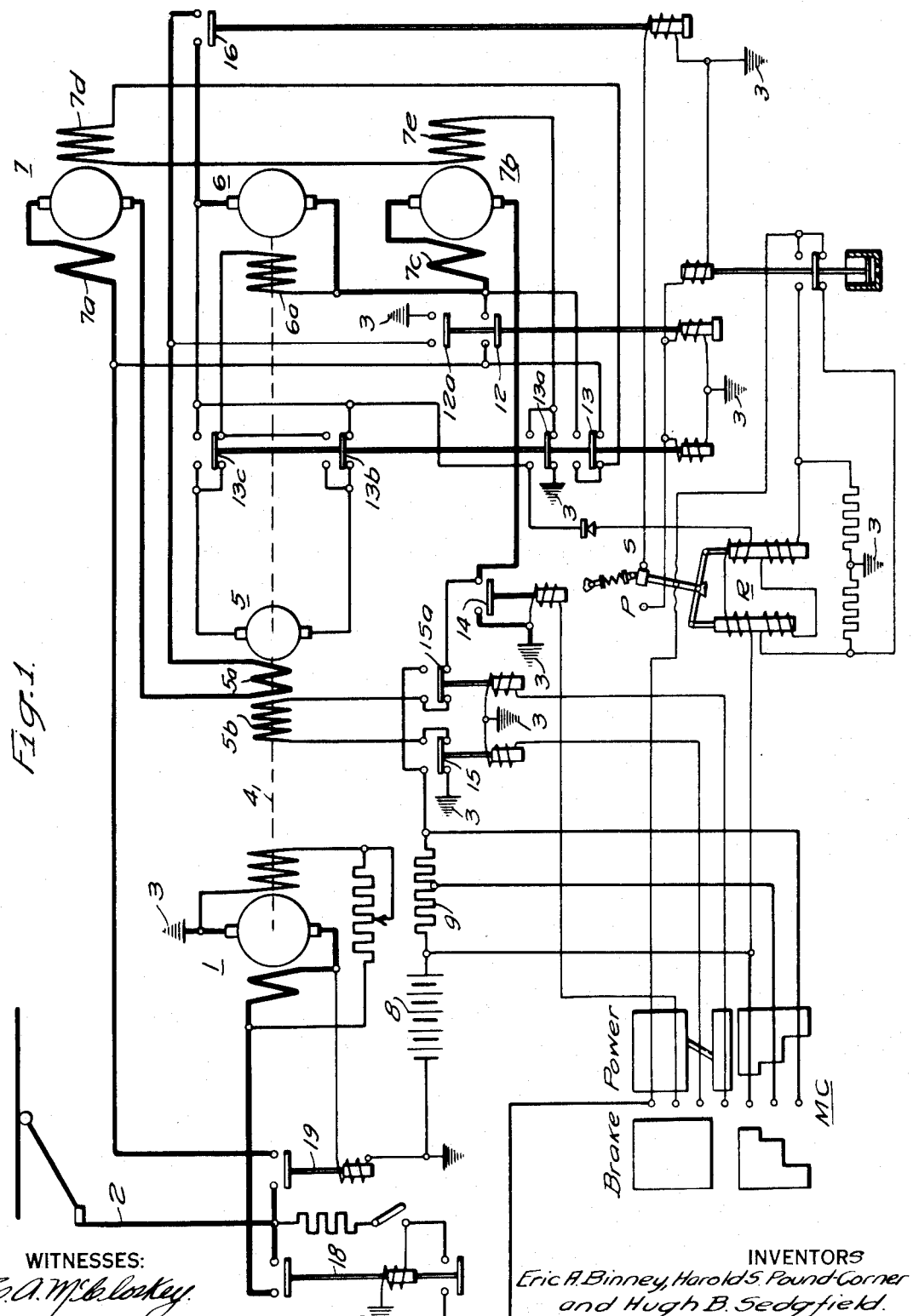

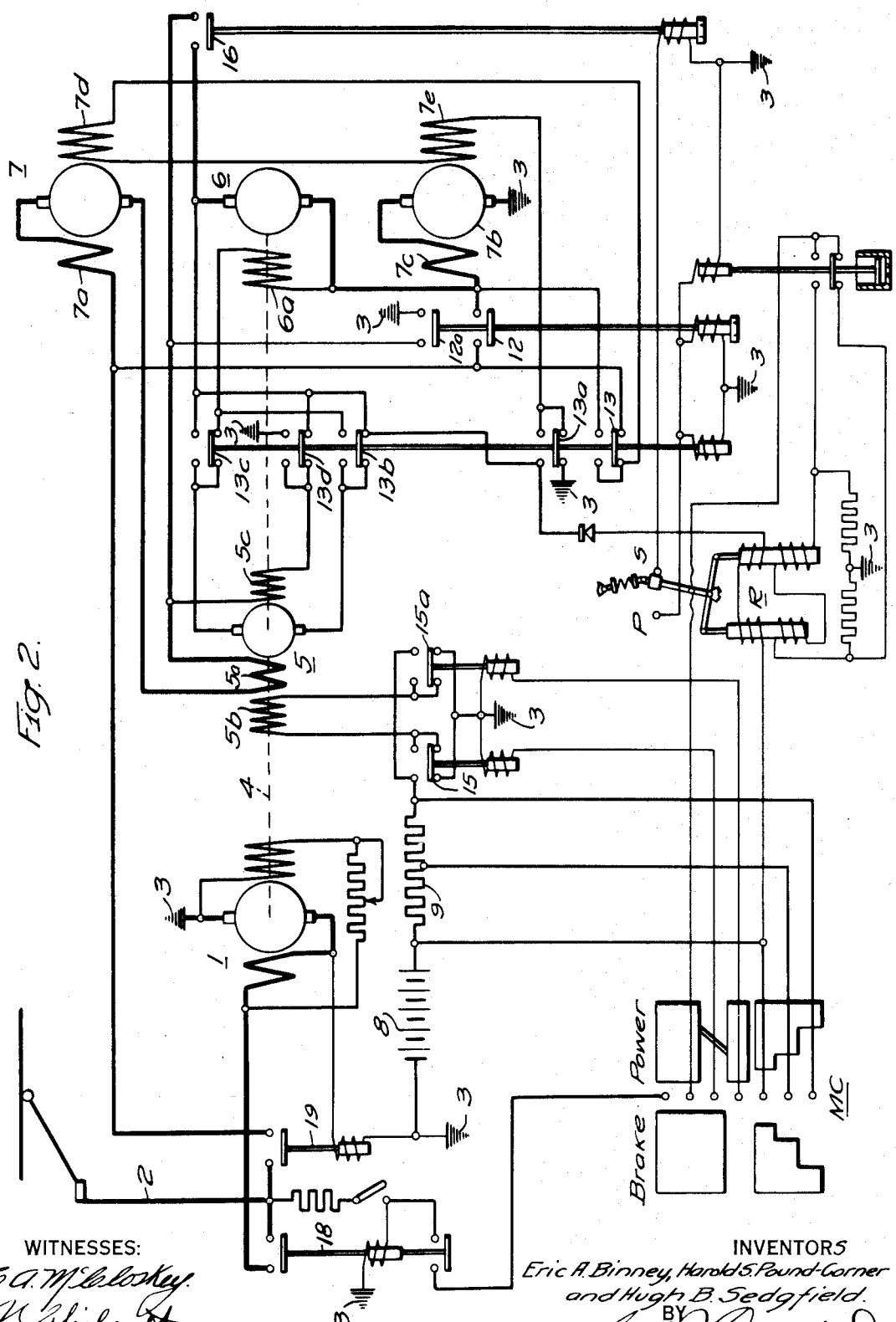

2,214,606

UNITED STATES PATENT OFFICE 2,214,606

MOTOR CONTROL SYSTEM

Eric Alton Binney, Ilkley, and Harold Sinclair Pound-Corner and Hugh Brougham Sedgfield, Bradford, England, assignors to The English Electric Company, Limited, London, England, a company of Great Britain Application September 7, 1939, Serial No. 293,686
In Great Britain September 8, 1938

8 Claims. (Cl. 172—179)

Our invention relates, generally, to motor control systems and, more particularly, to systems for controlling the operation of electric traction motors.

The external supply to an electric traction system is liable to considerable fluctuations in voltage. Accordingly, if the circuit through the traction motor armature from the external supply be interrupted and subsequently reclosed there may be in the meantime a substantial change in the supply voltage. If the traction motor be shunt or compound wound or if it includes any means of separate excitation and if it be coasting during disconnection from the supply, the motor will remain a back electromotive force, hereinafter referred to as E. M. F. but this may vary considerably due to changes of speed. Hence, as a result of changes of supply voltage or of back E. M. F. in the motor circuit it follows that on reconnection of the motor to the supply for restoration of power conditions or for regenerative braking neither the magnitude nor the direction of the difference between the supply voltage and the total E. M. F. in the traction motor circuit is certain. Consequently, there may be momentary heavy currents and severe applications of driving or braking torque on reconnection. The same problem is encountered in other electric power equipment.

It is essential in electric traction equipment and possibly also with other electric power equipment to be able to coast, i. e. to allow a traction or other working motor at times to continue to run without receiving electric energy from or giving up electric energy to the power supply. Again, there may be occasional interruptions of the circuit from the power supply through the motor armature.

It is the object of the present invention to allow of coasting while reducing or eliminating risks of electrical disturbance on a return to regenerative or power conditions or to reduce or eliminate such risks on reclosure of a switch for interrupting the circuit from the supply through the motor armature.

The invention acts by balancing the total back E. M. F. in the traction motor armature circuit against the voltage of the power supply and automatically maintaining one substantially equal to the other during coasting or whenever a disconnecting switch is open.

There are two methods of coasting according to the invention, viz.: by interruption of the armature circuit and without interruption, the former being preferred. Thus the invention comprises firstly the method of operating electric power equipment in which a disconnecting switch, in series with the motor armature, is opened for coasting and means responsive to the potential difference, hereinafter referred to as P. D. between two points in the motor armature circuit automatically maintains the total back E. M. F. in the motor armature circuit substantially equal and opposite to the P. D. of the power supply, i. e. they automatically maintain substantially zero P. D. across the contacts of the disconnecting switch while it is open. The invention furthermore comprises, in combination, an electric motor, a switch for connecting the motor armature to and disconnecting it from a power supply and means adapted, in response to any change in the P. D. between two points in the motor armature circuit while the switch is open, to vary the total back E. M. F. in that circuit in a sense tending to maintain it substantially equal to the voltage of the power supply, i. e. tending to maintain substantially zero P. D. across the contacts of the open switch. The said means may act by varying an E. M. F. injected into the motor armature circuit, i. e. they may act on the E. M. F. of a booster in series with an armature. Alternatively they may act on the excitation of the motor.

An important feature of the invention is the use of an exciter having a field winding carrying the motor armature current or a shunted part thereof and an opposing biasing field winding; this exciter tends always to maintain such an armature current that the effects of the two field windings balance each other. In utilizing this exciter the biasing field winding is connected across the contacts of the disconnecting switch.

The invention, although of general application, is particularly applicable to buck and boost equipment and is furthermore particularly applicable, firstly, to such equipment in which the booster is so excited that it will automatically maintain a substantially predetermined current in the motor armature circuit and, secondly, to such equipment for the automatic control of the acceleration and possibly also of the regenerative braking of D. C. traction motors. Particular forms of buck and boost equipment for accelerating and regeneratively braking traction motors at a predetermined current are described, for example, in the specifications accompanying the copending applications, Serial Nos. 293,684 and 293,685, filed September 7, 1939. When such equipment employs a differential exciter for maintaining the predetermined current this exater may also be used for voltage balancing according to the present invention by connecting a biasing field winding on this exciter across the disconnecting switch.

8. In buck and boost equipment, after the traction motor has been accelerated to its full voltage the load formed thereby may be transferred wholly to the external power supply and the booster then utilized to supply current to a motor field winding. The booster will then be able to maintain the back E. M. F. in the motor armature circuit, when the disconnecting switch is open, by acting on the motor excitation.

The invention furthermore comprises the second method of operation mentioned above—viz. the method of operating electric power equipment in which the circuit through the motor armature is never interrupted except when the motor is substantially at a standstill, but coasting is brought about by automatic means adapted to maintain the total back E. M. F. of the traction motor armature circuit substantially equal and opposite to the P. D. of the power supply whereby substantially no current flows through the motor armature. This method is also valuable as applied to buck and boost equipment of the type discussed above and, as applied thereto, can be carried out by adjusting the automatic excitation means so that the current automatically maintained is substantially zero.

Two specific embodiments of the invention, as applied to buck and boost equipment for the control of traction motors, are shown in the accompanying drawings Figs. 1 and 2, which are diagrammatic views of control systems embodying the invention.

In Figure 1 the booster set comprises compound-wound motor 1 connected between supply lead 2 and the common earth connection 3 and on the same shaft 4 the exciter 5 and the booster 6. The booster can be connected as shown in series with the compound wound traction motors 7 and 7b also between the supply lead 2 and the earth connection 3. The booster has a field winding 6a connected across its armature in series with the exciter 5. The exciter has a field winding 5a in series with the booster 6 and the motors 7 and 7b and a biasing field winding 5b.

The winding 5b on the exciter is shown as connected across the battery 8 on the vehicle in series with the resistor 9 by means of which the current can be varied and determined.

Switches 12 and 12a are for transferring the load formed by the traction motors wholly to the power supply and may be closed when the motors have been brought up to full voltage, as described later. At the same time the field windings 7d and 7e of the motors, which windings are connected directly across the external power supply during acceleration, can be transferred to the booster by movement of switches 13 and 13a. The switch 14 is shown for interrupting the circuit from 2 to 3 through the traction motor armatures. Switches 15 and 15a are shown for reversing the connections of exciter field winding 5b.

The total resistance in the circuit of the booster field winding 6a is so adjusted that the booster is substantially self-exciting; the exciter always influences the booster E. M. F. in such a way as to tend to maintain such a traction motor current that the excitation produced by the exciter field winding 5a substantially balances that produced by the winding 5b, i. e. the tendency is always to reduce the exciter E. M. F. to zero.

Normally switch 14 is open when the driver's master controller M. C. is in the off position and is always closed when the master controller is in any power or brake position. Switches 15 and 15a are in the positions shown when switch 14 is open.

With the booster set running but with switch 14 still open the current through field winding 5a is negligible. The exciter thus tends to maintain a condition of substantially zero current in winding 5b—i. e. a condition in which the booster E. M. F. is substantially equal and opposite to the supply voltage and there is consequently substantially zero P. D. across the contacts of switch 14. The latter can thus be closed without disturbance. The various switches 12—16 will usually be contactors, of which 14 is under the control of the driver's controller.

If the latter now be moved to a power notch to start the vehicle, contactor 14 closes as does also contactor 16 between motor 7 and booster 6, thus putting the motors 7 and 7b in series with the booster 6 across the supply. Switch 15a is moved over to the other position, thus connecting exciter field winding 5b between earth and the battery 8. The traction motors will then accelerate, the exciter controlling the booster E. M. F. in such manner as to maintain substantially constant booster and traction motor armature current; the booster E. M. F. decreases gradually to zero, reverses, and then increases until it is equal to and in the same direction as the supply E. M. F. The switches or contactors 12 and 12a can then be closed to connect the two traction motors and the booster armature in parallel with each other across the supply. Switch or contactor 16 can next be opened to disconnect the booster from the supply and switches 13 and 13a moved over to connect the field windings 7d and 7e to the booster. If the connections of the exciter armature 5 be reversed by switches 13b and 13c the booster 6 will then excite the traction motors in such manner as still to tend to maintain substantially a predetermined current in the traction motor armature circuit.

If the driver's controller M. C. be subsequently moved to a notch for regenerative braking, switch 15a will return to or remain in the position shown but switch 15 will be operated to connect field winding 5b in a reverse sense from that for power operation. Braking conditions may be established with switches 12 and 12a either open or closed and the booster will in each case tend to maintain substantially a predetermined regenerated current.

One method of coasting consists in moving the controller M. C. to a position in which the exciter 5 excites the booster in such a manner as to tend to maintain zero current in the traction motor armature circuit. This in fact consists in moving the controller M. C. to a position in which the resistor 9 is all in the circuit and substantially no current passes through field winding 5b. With the booster in series with the motors the booster E. M. F. will be automatically regulated to maintain zero booster current. Alternatively coasting may be brought about by opening switch or contactor 14 when switches 15 and 15a will both return to the position shown.

If contactor 14 should be open for coasting or if it should be open for any other reason, the field winding 5b will then be connected across the open contacts of switch 14, i. e. in series with the traction motors and booster across the supply. There will then be substantially no current flowing through the exciter field winding 5a. The exciter will then influence the booster E. M. F. in such a manner as to tend to maintain zero current also in the exciter field winding 5b, i. e. so that there is no potential difference across the contacts of switch 14. Any fluctuations in supply E. M. F. or any changes in motor back E. M. F. due to changes of vehicle speed will thus bring about corresponding changes in booster E. M. F. in such manner as to tend to maintain the E. M. F. in the motor and booster armature circuit substantially equal to the supply voltage so that switch 14 can be reclosed at any time without any appreciable electrical disturbance.

With the switches 12 and 12a closed to connect the motors in parallel across the supply, with switch 16 open, with the exciter armature connections reversed and with switch 13 moved over to a position to connect the field windings 7d and 7e across the booster 6, the latter is able to influence the traction motor E. M. F. and current by acting upon by the motor excitation. Thus coasting can again be brought about by setting rheostat 9 to the zero current position. If now switch 14 be open for coasting or any other purpose, the field winding 5b will again be connected across the contacts of switch 14 and the current through field winding 5a of the booster will be reduced almost to zero. The exciter will again act on the booster in a way tending to reduce the exciter E. M. F. to zero, i. e. to reduce the current in field winding 5b substantially to zero and hence the booster will excite the traction motors in such manner as to tend to maintain the back E. M. F. of each equal to the E. M. F. of the power supply so that at any time the switch 14 can be reclosed without electrical disturbance.

In the foregoing system, the switch 14 has to be designed to carry the maximum total motor current. In the important modification shown in Fig. 2 an extra field winding is provided on the exciter for the purpose of balancing traction motor and booster E. M. F.'s against the supply voltage in order to eliminate the contactor 14. Those parts in Fig. 2 which are the same in Fig. 1 are indicated by the same reference numerals. The additional field winding on the exciter 5 is indicated by the reference 5c and is adapted to be connected by the switch 13d across the contacts of the switch 16 when motors and booster are in series across the external supply or across the contacts of switch 12a when the motors are connected in parallel across the external supply. With the series connection coasting can be introduced by opening switch 16 when the action of the exciter will tend to maintain such a value of booster E. M. F. that the P. D. across the contacts of switch 16 is always substantially zero. With the parallel connection coasting can be introduced by opening switches 12 and 12a without closing switch 16. The exciter will then cause the booster to excite the motor 7 in such manner as to tend to maintain the P. D. across the contacts of switch 12a substantially zero. Motor 7b is similarly excited and accordingly there will be a similar tendency to maintain zero P. D. across the contacts of switch 12. The switches 15 and 15a interrupt the circuit for the field winding 5b when the switches 16 and 12a are open so that it is not possible for both field windings 5b and 5c to be energized at the same time.

In the event of a failure of the external supply the relay 18 disconnects the motor 1 from the supply lead 2 and causes opening of the contactor 19. It may also cause the contactor 14 of Fig. 1 to open and the switches 15 and 15a to move to the position shown. On restoration of the supply and when the motor 1 has been again accelerated contactor 19 can be reclosed. The field winding 5b then tends to bring about the condition of zero P. D. across switch 14 which can then be reclosed.

In the arrangement according to Fig. 2 the relay 18 may cause all the switches 12, 12a and 16 to be open, when field winding 5c tends, on a restoration of supply, to bring about the condition of zero P. D. across the switch 16 or the switch 12a.

If the field winding 5c be omitted as well as the connection of winding 5b across switch 14 the equipment must be operated so that the circuit of the traction motors is never broken while they are running. Once the booster E. M. F. has been adjusted to be equal and opposite to the supply voltage and switch 16 has been closed to start the motors, the latter remains closed until the switches 12 and 12a close, recloses before they open, and remains closed thereafter until the motors have been brought substantially to rest. These switches remain closed when switch 19 opens in response to opening of the no-current relay 18 and so the circuit of the motors is uninterrupted, for, as will be seen, the machine 1 and the motors 7 and 7b form a closed circuit. With this modification contacts—not shown—cause field winding 5b of the exciter to be deenergized while switch 19 is open. On restoration of the supply the action of the exciter thus tends to maintain zero current through the traction motor armatures by keeping the total back E. M. F. in the circuit equal and opposite to the P. D. of the supply. When the motor 1 has again run up to speed the switch 19 can be reclosed without causing disturbance in the traction motor circuit and the field winding 5b becomes energized again for maintaining the appropriate current.

The transfer switches 12 and 12a are preferably contactors operated automatically under the control of a polarized relay R responsive to zero P. D. across one of them, as described in our aforementioned copending application, Serial No. 293,685. The same relay R may control the contactor 16.

The application of the invention to a system which is not a buck and boost system can be clearly seen from the drawings by assuming switch 16 to be permanently open, i. e. completely omitted. Switches 12 and 12a are then for connecting motors 7 and 7b, etc., in parallel across the power supply. Starting resistances and the usual starting means are provided for these motors. Machine 6 is then merely an exciter for the motors, the field windings 7d and 7e being permanently connected thereto. If field winding 5c is provided it is connected permanently across switch or contactor 12a. It will be seen that the combination of exciter 6 and sub-exciter 5 functions, as described, to maintain substantially zero P. D. across any disconnecting switch that is open, or to bring about coasting by exciting the motors so that the back E. M. F. of each is substantially equal and opposite to the voltage of the power supply.

Any of the arrangements described are applicable to the control of a single motor.

Since many modifications may be made in the apparatus and arrangement of parts without departing from the spirit of our invention, we do not wish to be limited other than by the scope of the appended claims.

We claim as our invention:

1. In a motor control system, in combination, an electric motor, a switch for connecting the motor armature to and disconnecting it from a power supply, a buck-boost machine in series with the motor armature, and excitation means responsive to a change in the potential difference across the contacts of said switch while the switch is open for controlling the excitation and hence the electromotive force of the buck-boost machine to maintain the total back electromotive force in said circuit substantially equal to the voltage of the power supply, thereby maintaining substantially zero potential difference across the open contacts of the switch.

2. In a motor control system, in combination, an electric motor, a switch for connecting the motor armature to and disconnecting it from a power supply, a booster, means for connecting the booster in series with the motor across the power supply for operation on the buck and boost principle, switching means for transferring the load formed by the motor armature wholly to the said power supply and back again, additional switching means for connecting the booster as an exciter for the motor, and means responsive to a change in the potential difference between two points in the interrupted motor armature circuit while the switch is open for controlling the booster excitation both when it is in series with the motor armature and when it is serving as an exciter for the motor to maintain the total back electromotive force in said circuit substantially equal to the voltage of the power supply, thereby maintaining substantially zero potential difference across the open contacts of the switch.

3. In a motor control system, in combination, an electric motor, a switch for connecting the motor armature to and disconnecting it from a power supply, a booster, means for connecting the booster in series with the motor across the power supply for operation on the buck and boost principle, an exciter, a field winding thereon energized by the motor armature current, an opposing field winding on the exciter, and means for connecting the latter winding across the contacts of the disconnecting switch, said exciter acting on the excitation of the booster to maintain a balance between the opposing field windings, thereby maintaining substantially zero potential difference across the open contacts of the switch.

4. In a motor control system, in combination, an electric motor, a switch for connecting the motor armature to and disconnecting it from a power supply, a booster, means for connecting the booster in series with the motor across the power supply for operation on the buck and boost principle, a differentially wound exciter for the booster adapted to maintain a predetermined motor armature current when the disconnecting switch is closed and substantially zero potential difference across the switch when it is open, said exciter having a field winding energized by the motor armature current and an opposing field winding, and means for varying the excitation of said opposing winding to control the motor armature current.

5. In a motor control system, in combination, an electric motor, a switch for connecting the motor armature to and disconnecting it from a power supply, a booster, means for connecting the booster in series with the motor across the power supply for operation on the buck and boost principle, a differentially wound exciter for the booster adapted to maintain a predetermined motor armature current when the disconnecting switch is closed and substantially zero potential difference across the switch when it is open, a field winding on the said exciter energized by the motor armature current, an opposing field winding on the exciter, and means for disconnecting the latter winding from its normal supply and connecting it across the disconnecting switch when said switch is open, the exciter acting on the booster excitation to maintain a balance between the field windings that oppose each other.

6. In a motor control system, in combination, an electric motor, a switch for connecting the motor armature to and disconnecting it from a power supply, a booster, means for connecting the booster in series with the motor across the power supply for operation on the buck and boost principle, a differentially wound exciter for the booster adapted to maintain a predetermined motor armature current when the disconnecting switch is closed and substantially zero potential difference across the switch when it is open, a field winding on the said exciter energized by the motor armature current, an opposing field winding on the exciter, means for disconnecting the latter winding from its normal supply, an additional opposing field winding on the exciter, and means for connecting said additional winding across the disconnecting switch when said switch is open, the exciter acting on the booster excitation to maintain a balance between the field windings that oppose each other.

7. In a motor control system, in combination, an electric motor, a switch for connecting the motor armature to and disconnecting it from a power supply, a booster, means for connecting the booster in series with the motor across the power supply for operation on the buck and boost principle, a differentially wound exciter for the booster adapted to maintain a predetermined motor armature current when the disconnecting switch is closed and substantially zero potential difference across the switch when it is open, a field winding on the said exciter energized by the motor armature current, an opposing field winding on the exciter, means for disconnecting the latter winding from its normal supply, an additional opposing field winding on the exciter, means for connecting said additional winding across the disconnecting switch when said switch is open, the exciter acting on the booster excitation to maintain a balance between the field windings that oppose each other, and means for preventing the simultaneous energization of the latter two field windings on the exciter.

8. In a motor control system, in combination, an electric motor, a switch for connecting the motor armature to and disconnecting it from a power supply, a booster, means for connecting the booster in series with the motor across the power supply for operation on the buck and boost principle, switching means for transferring the load formed by the motor armature wholly to the said power supply and back again, said booster functioning to maintain automatically a predetermined motor armature current, an exciter for the booster, a field winding thereon energized by the motor armature current, an opposing field winding on the exciter, means for energizing this winding, an additional opposing field winding on the exciter, changeover switching means for connecting this latter winding either across the disconnecting switch which interrupts the series connection of motor and booster or across one of the transfer switches, and means for deenergizing the first-named opposing field winding upon opening of the switch across which the second-named opposing field winding is connected, the exciter acting on the booster excitation to maintain a balance between the field windings that oppose each other.

ERIC ALTON BINNEY.
HAROLD SINCLAIR POUND-CORNER.
HUGH BROUGHAM SEDGFIELD.